United States Patent
Ho et al.

(10) Patent No.: US 8,799,968 B2
(45) Date of Patent: Aug. 5, 2014

(54) METHOD AND APPARATUS FOR TRACKING USER LOCATION WITHIN VIDEO OR AUDIO CONTENT STREAMED TO A MOBILE HANDSET

(75) Inventors: Edwin Ho, Palo Alto, CA (US); King Sun Wai, Castro Valley, CA (US)

(73) Assignee: Samsung Information Systems America, Inc., San Jose, CA (US)

( * ) Notice: Subject to any disclaimer, the term of this patent is extended or adjusted under 35 U.S.C. 154(b) by 1771 days.

(21) Appl. No.: 11/788,494

(22) Filed: Apr. 20, 2007

(65) Prior Publication Data

US 2009/0092378 A1   Apr. 9, 2009

(51) Int. Cl.
*H04N 21/472* (2011.01)
*H04N 21/258* (2011.01)

(52) U.S. Cl.
CPC .... *H04N 21/47217* (2013.01); *H04N 21/47202* (2013.01); *H04N 21/25808* (2013.01)
USPC ................ 725/88; 725/58; 725/115; 725/116

(58) Field of Classification Search
USPC ....................................................... 725/102
See application file for complete search history.

(56) References Cited

U.S. PATENT DOCUMENTS

| | | | | |
|---|---|---|---|---|
| 5,721,829 | A | * | 2/1998 | Dunn et al. ................ 725/87 |
| 2003/0033347 | A1 | | 2/2003 | Bolle et al. |
| 2006/0015637 | A1 | | 1/2006 | Chung |
| 2006/0080167 | A1 | * | 4/2006 | Chen et al. ................. 705/14 |
| 2006/0174290 | A1 | * | 8/2006 | Garwin et al. ............. 725/88 |
| 2007/0169159 | A1 | * | 7/2007 | Aaby et al. ................. 725/97 |
| 2008/0060029 | A1 | * | 3/2008 | Park et al. .................. 725/89 |
| 2008/0320523 | A1 | * | 12/2008 | Morris et al. .............. 725/47 |
| 2009/0228926 | A1 | * | 9/2009 | Van De Sluis et al. .... 725/39 |

OTHER PUBLICATIONS

International Search Report, PCT/US2008/005105, Aug. 14, 2008.
Written Opinion, PCT/US2008/005105, Aug. 14, 2008.

* cited by examiner

*Primary Examiner* — Bennett Ingvoldstad
(74) *Attorney, Agent, or Firm* — Kenneth L. Sherman, Esq.; Michael Zarrabian, Esq.; Sherman & Zarrabian LLP

(57) ABSTRACT

A method and apparatus for providing audio or video content to a mobile handset is provided.

20 Claims, 5 Drawing Sheets

METHOD AND APPARATUS FOR TRACKING USER LOCATION WITHIN VIDEO OR AUDIO CONTENT STREAMED TO A MOBILE HANDSET

FIELD OF THE INVENTION

The invention relates generally to a method and apparatus for providing video or audio content to a mobile handset.

BACKGROUND OF THE INVENTION

In recent years, mobile handsets (such as cellular phones and PDAs) have become more powerful and now offer additional functionality beyond just voice communication. For instance, many mobile handset devices today allow users to perform web browsing on the Internet, receive emails, and play video and audio content streamed from over a wireless network. Such devices contain increasingly powerful processors and enhanced video and audio capability. However, their storage capacity is generally much smaller than the capacity of PCs and notebook computers. As a result, users of mobile handsets are reliant upon video and audio content that is streamed rather than downloaded and stored permanently. The mobile handsets also tend to have relatively small buffers in which to store the streamed data before it is played on the mobile handset.

If a mobile handset user wishes to stop listening to streamed audio content or watching streamed video content while the content is still playing, then the mobile handset will stop playing the content and will inform the source of the streaming data (usually a server connected to the wireless network) to stop streaming the data. It would be desirable for the server or other source device to be able to keep track of the user's location (e.g., the number of bits from the beginning of the content, amount of time that elapsed since the content began playing, or some other measure) within the content when he or she stops the content, so that the user can continue playing the data at the same location at a later time.

Digital content often is broken into sub-sections (e.g., chapters in a DVD movie) by the provider of the source content. Under current mobile handset technology, if a user wishes to begin playing the content at a place other than the beginning section, then the mobile handset must first begin playing at the beginning section and then move to the desired section and begin playing at the desired section. It takes approximately 15 seconds to begin playing any given section (which corresponds to the time it takes to fill the buffer in the mobile handset with data), so the end result in this scenario is that the user will need to wait approximately 30 seconds before he or she can begin listening to or watching the desired section. It would be desirable for a user to be able to begin listening to or watching any section of the content with only one buffer delay instead of two.

SUMMARY OF THE INVENTION

In accordance with the invention, a method and apparatus are provided to keep track of a user's location within streamed audio or video data when a user stops the playing of the content, and to enable the user to resume playing the content at the same location at a later time.

In accordance with another aspect of the invention, a method and apparatus are provided to enable a user to begin streamed audio or video data at a section other than the first section while incurring only one buffer delay period.

DETAILED DESCRIPTION OF A PREFERRED EMBODIMENT

Figure 1:
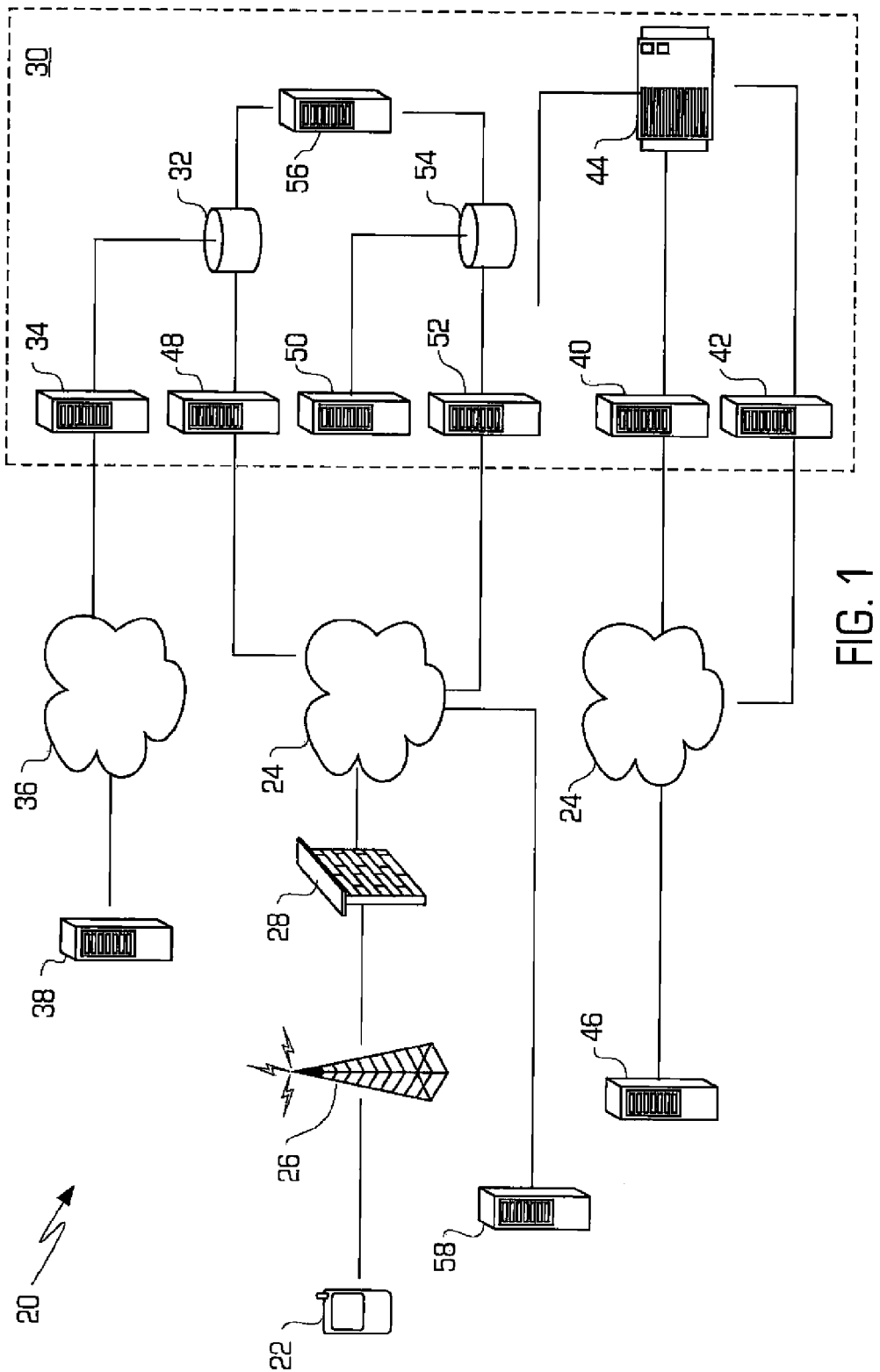
FIG. 1 is a block diagram of a mobile handset device service system.

FIG. 1 depicts a typical mobile handset service system 20. The mobile device service system 20 provide one or more services, such as movies, videos, sports information, music, etc. to a mobile handset 22 that includes a client application, such as a JAVA piece of code, that processes the incoming service data and displays the service data to the user of the mobile device. The mobile handset 22 may be any processing unit based device that is hand-sized with sufficient processing power, memory, display and connectivity capabilities to execute the client application, receive the service data and display that service data. For example, the mobile device may be a PDA, mobile phone, or wireless email device (such as the Blackberry). In the example shown in FIG. 1, the mobile device 22 couples to a communications link 24, such as the Internet, over a wireless network 26 and a firewall 28. The mobile handset service system 20 also has a service unit 30 that performs various function and operations for the mobile handset service system.

The service unit 30 may include a user information storage unit 32 that stores information about each user of the mobile handset service system including user billing information and user service personalization information. The service unit 30 may also have a billing server 34 that performs a billing operation for the services provided to the user. In the example shown in FIG. 1, the billing for the services are communicated over a secure link 36, such as a secure socket layer (SSL) connection, to a carrier billing system 38 so that the mobile device carrier can provide the bill for the services on the monthly invoice of the user of the mobile device. Alternatively, the service unit 30 can directly bill the user. The service unit 30 may also include a live content ingester 40, a clip digester 42 and a content/asset storage unit 44 that handle the service content (such as music, movies, etc.) from a third party 46 that will be delivered by the mobile handset service system. The live content ingester receives any live content and processes it and then stores the live content in the content/asset storage unit 44 in various output encoding file formats. The clip digester 42 receives non-live content and data, processes it and then stores the clips in the storage unit 44 in various output encoding and file formats.

The service unit 30 may further include a menu/personalization unit 48, a reporting unit 50, a streaming unit 52, a log database 54 and a data mining unit 56. The menu/personalization unit 48, the reporting unit 50, the streaming unit 52 and the data mining unit 56 may preferably each be server computers. The menu/personalization unit generates and delivers the mobile device service user interfaces to the user that may also be customized by the user based on the customization information stored in the user information storage unit 32. The streaming unit may preferably support the real-time streaming protocol (RTSP) and the hypertext transfer protocol (HTTP) and may deliver/stream the service content to the mobile device over the link 24. The streaming unit may request the service content from the content store 44 and may store service content information in the log store 54. The reporting unit 50 may generate a report about various aspects of the service unit and its operations. The data mining unit 56 collects user behavior information which is then mined to determine any recommendations and personalizations for users of the system.

A user of mobile handset 22 can run various applications on the handset, such as an application that enables the user to listen to music, an audiobook or eBook, or other audio programming or to watch a movie, TV show, or other video content streamed from streaming unit 52. In one embodiment of the invention, streaming unit 52 will send the digital content to the mobile handset 22 and will also send metadata to the mobile handset 22. The metadata can include information such as the title of the song or video, the duration of the song or video, etc. The metadata also can include a URL for a website housed on third-party server 58 that offers products for sale that are relevant to the content being streamed to mobile handset 22. Examples of such products might include ringtones that contain the same music being streamed to mobile handset 22, CDs containing the same music, DVDs containing the video being streamed to mobile handset 22, etc.

Figure 2:
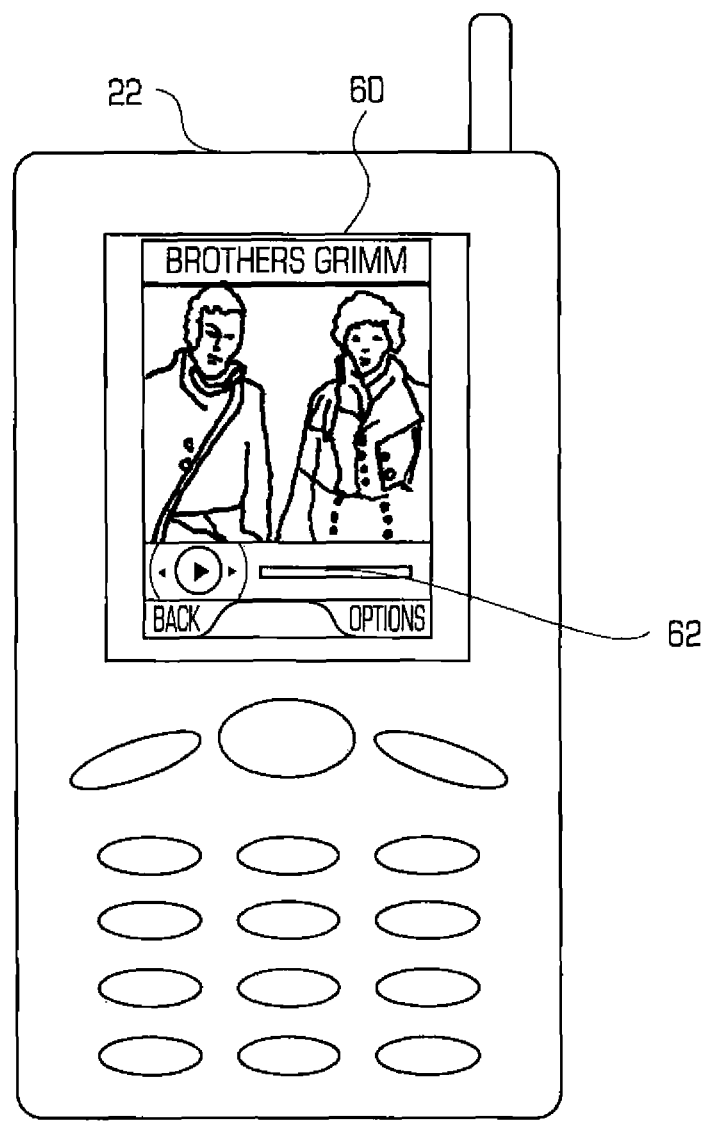
FIG. 2 illustrates an example of a mobile handset device that graphically shows the user's location within content that is being played on the handset.

Referring now to FIG. 2, mobile handset 22 is shown in greater detail. It is to be understood that FIG. 2 is exemplary and that the invention is not limited to the particular aesthetic or functional features displayed in FIG. 2. Mobile handset 22 includes a video display 60. Mobile handset 22 includes a speaker (not shown) that generates audio content. Thus, a user of mobile handset 22 can watch video content of video display 60 and listen to audio content through a speaker. In FIG. 2, video display 60 shows an exemplary user interface for one embodiment of the invention. The video display 60 shows a movie being streamed to mobile handset 22 by streaming unit 52. It shows a graphic depiction 62 showing the user's location within the movie (or within a chapter or other sub-part of the movie). The length of the movie (or of the chapter or other sub-part) was transmitted to mobile handset 22 as metadata. Mobile handset 22 measures the user's location within the movie (which corresponds to graphic depiction 62) by initiating a timer when the content begins playing. The timer can be implemented in hardware or software. The timer can be based on any time metric—e.g., minutes, seconds, microseconds, clock cycles, etc.

Figure 3:
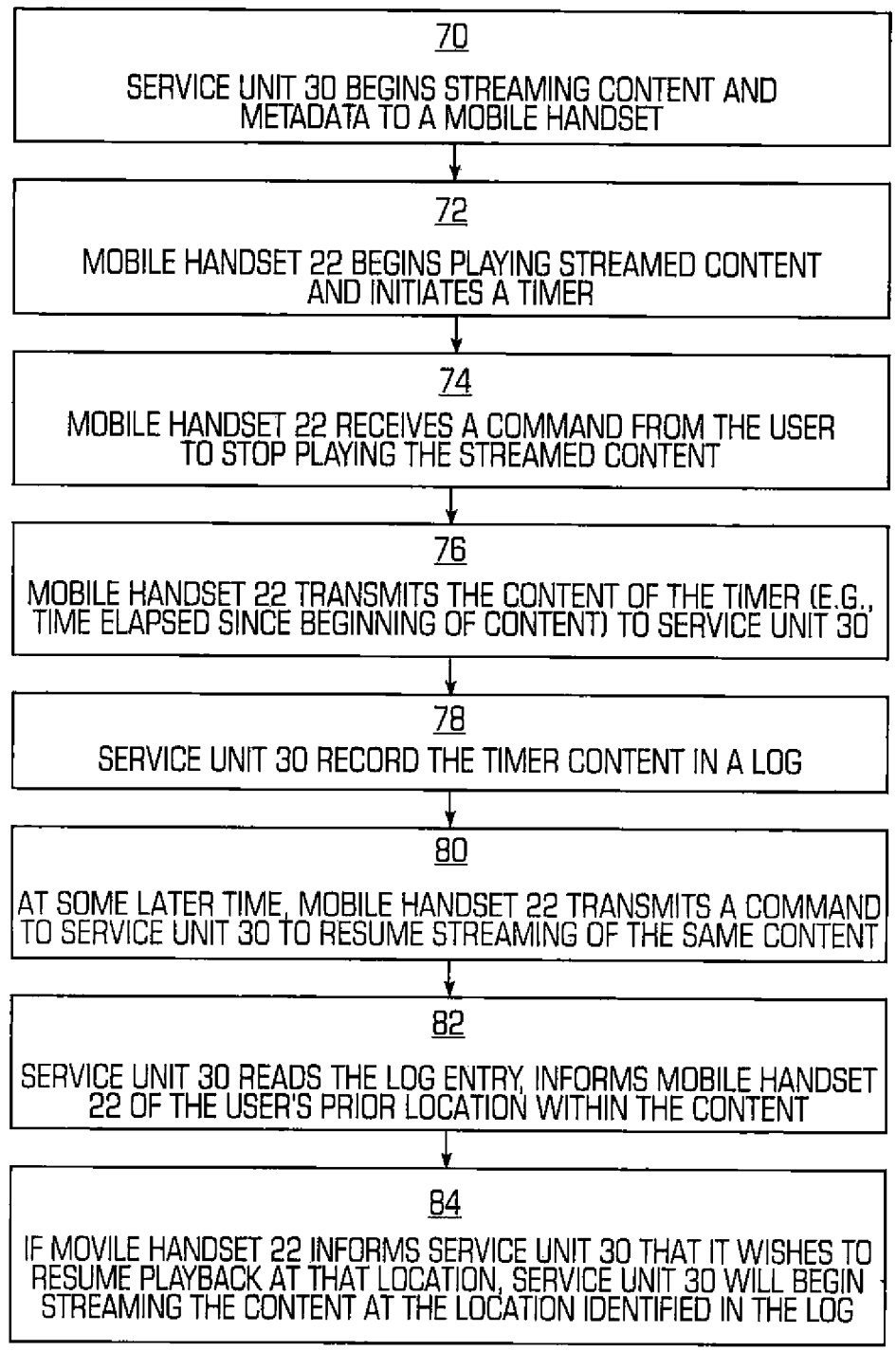
FIG. 3 is a flow chart depicting an embodiment for keeping track of a user's location within digital content to enable the user to resume playback at that same location at a later time.

Referring now to FIG. 3, one embodiment is shown. A mobile handset 22 receives a command from a user to begin playing certain digital content. Mobile handset 22 then requests that content from service unit 30. Service unit 30 then begins streaming that content and associated metadata to mobile handset 22 (70). Mobile handset 22 fills its buffer with a portion of the content and then initiates a timer and begins playing the streamed content (72). At a later point in time, mobile handset 22 receives a command from the user to stop playing the streamed content (74). Mobile handset 22 then transmits the content of the timer (or data that corresponds to the content of the timer) to service unit 30 (76). For example, the content of the timer might comprise the time that elapsed since the beginning of the movie. Service unit 30 then records the content of the timer (or data that corresponds to the content of the timer) in a log that is associated with that particular user and/or mobile handset 22 (78). The log entry will reflect the user's location within the content at the time the content stopped playing on mobile handset 22. At some later time, mobile handset 22 transmits a command to service unit 30 to resume streaming of the same content (80). Service unit 30 reads the log entry and informs mobile handset 22 of the user's prior location within the content (82). If mobile handset 22 informs service unit 30 that it wishes to resume playback at that location, service unit 30 will begin streaming the content at the location identified in the log (84).

Figure 4:
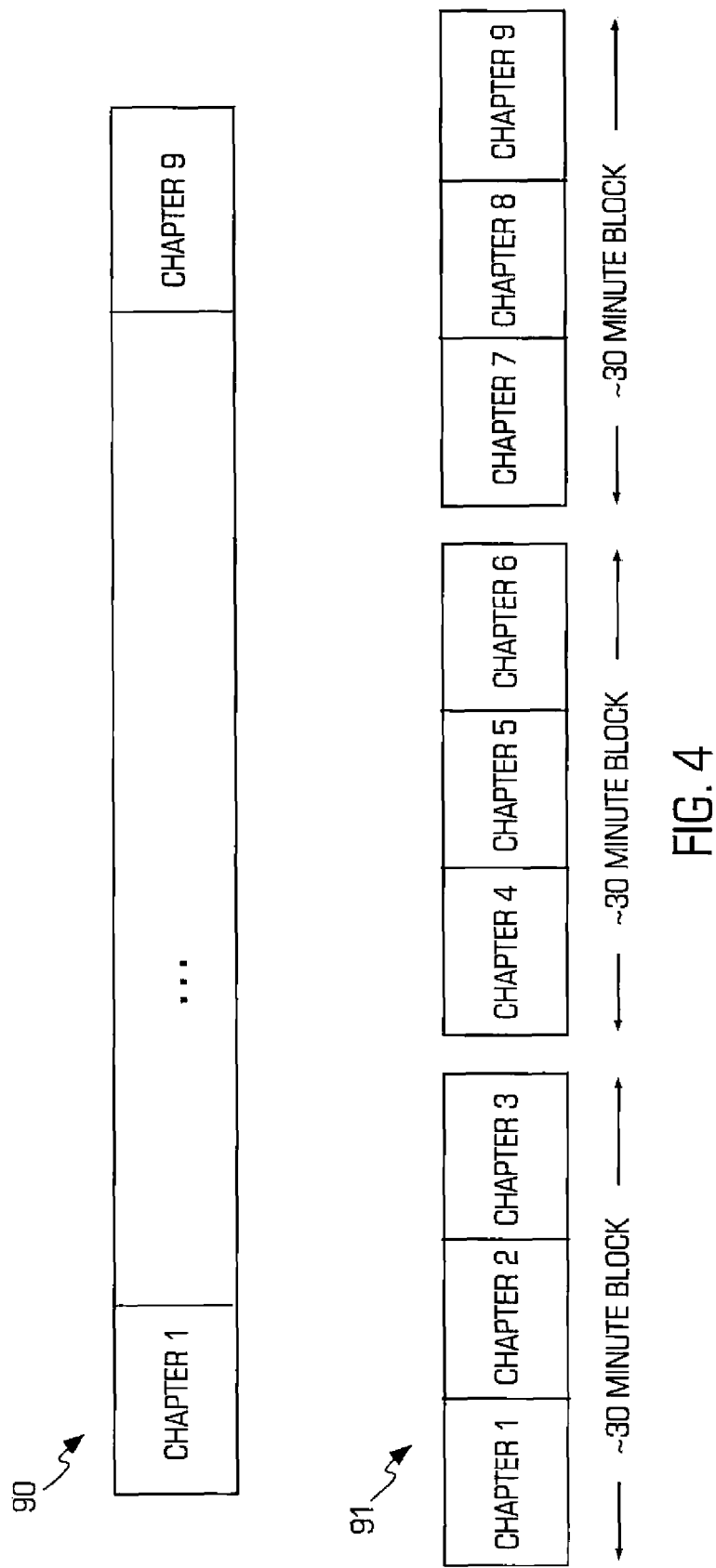
FIG. 4 illustrates the prior art method of dividing digital content into blocks of approximately 30 minutes in duration, and further dividing each block into divisions such as chapters.
Figure 5:
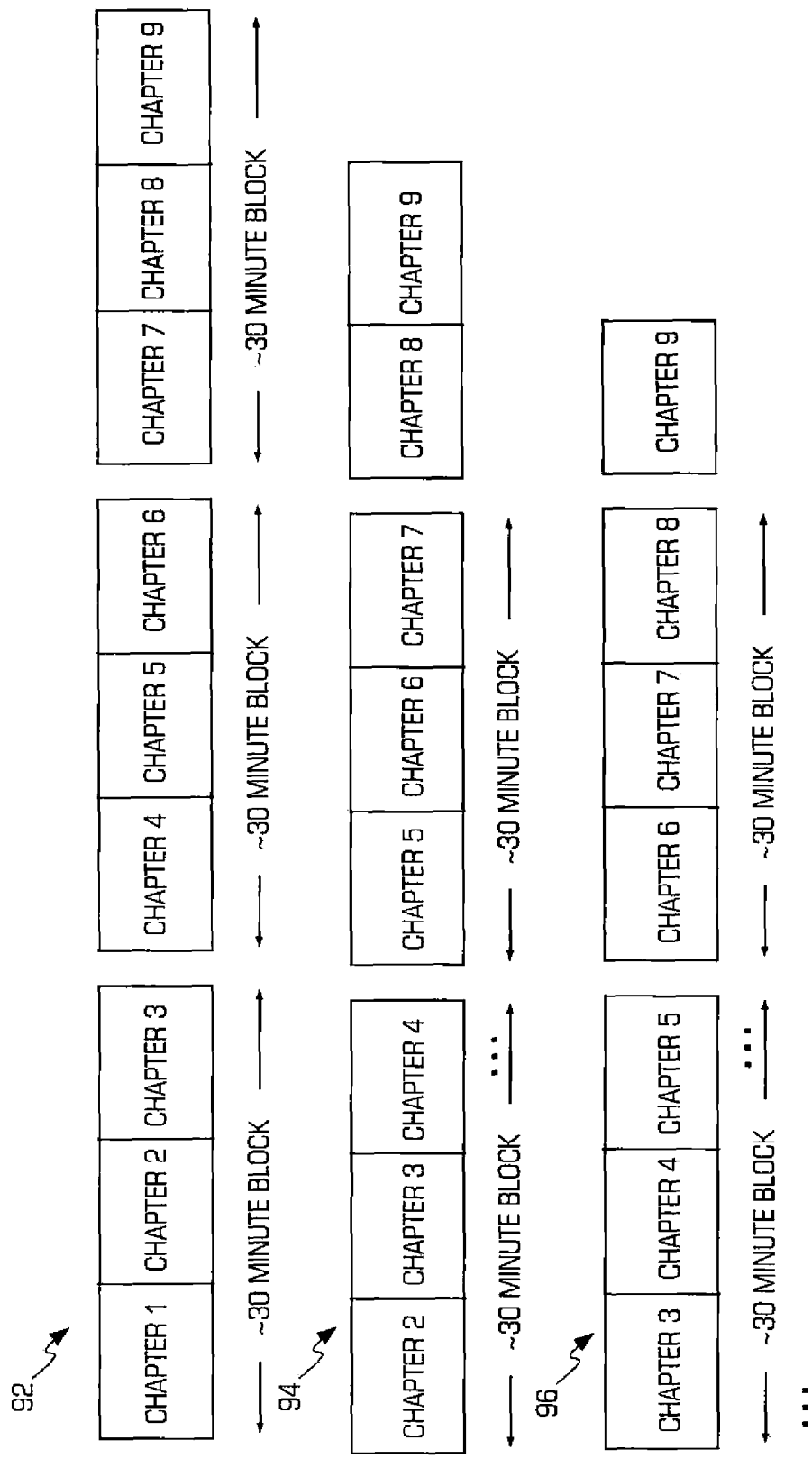
FIG. 5 illustrates an example of a means for permitting a user to begin playing digital content at a location other than the first division, and doing so without reducing the total 30 minute duration before switching to the next block.

Referring now to FIGS. 4 and 5, another embodiment is shown. Video digital content is often divided into parts (e.g., chapters in a movie). In FIG. 4, exemplary video content 90 is shown. As an example, video content 90 is shown as a movie consisting of nine chapters, and for illustrative purposes, each chapter is assumed to be ten minutes long. Under current mobile handset technology, the total maximum size of a data block to be streamed is limited to approximately 30 minutes. This is because the timer of mobile handset 22 currently can only count up to approximately 30 minutes. Thus, if the user of mobile handset 22 watches a streamed movie that is 90 minutes long, service unit 30 will need to break the entire movie into sub-parts, each of a maximum size of 30 minutes. One approach 91 would be to stream a first block of 30 minutes, then a second block of 30 minutes, then a third block of 30 minutes. This means that video content 90 will be divided into 3 blocks of 30 minutes, which in our example breaks down to 3 chapters per block. Between each block, there will be a delay to the user of approximately 15 seconds as the buffer of mobile handset 22 fills with the beginning of the next block.

Under this approach, if a user wishes to begin watching the movie at chapter 2 (instead of at chapter 1), service unit 30 will stream data block 91 to mobile handset 22. Mobile handset will then fill its buffer with the beginning of chapter 1 (which results in a 15 second delay), then momentarily begins playing chapter 1 and then skips to chapter 2 (which results in another 15 second delay). Thus, there will be a 30 second delay before chapter 2 begins playing. Also, because the total data block size is limited to 30 minutes, the amount of time remaining before service unit 30 will need to switch to the next data block (this is analogous to switching tapes in a traditional movie projector) will now be less than 30 minutes (more specifically, 30 minutes minus the length of chapter 1).

In FIG. 5, a different approach is depicted. Service unit 30 instead creates and stores a number of different data blocks, each with a unique starting location—one beginning with chapter 1 (92), one beginning with chapter 2 (94), one beginning at chapter 3 (96), etc. The end result is that if the user wishes to begin playing the movie at chapter 2, service unit 30 will then stream block 94 to mobile handset 22, and there will be only one 15 second delay while the buffer fills with the beginning of data block 94. Also, there will now be 30 minutes before service unit 30 will need to switch to the next data block. It will be understood by one of skill in the art that the data blocks can be any type of digital data (video, music, etc.), and that the chapters can be any type of division of such data (chapters, tracks, etc.).

The methodology shown in FIG. 5 is useful any time the user wants to begin at a location other than the beginning of chapter 1, including the situation where he or she wishes to resume playback at the same location where he or she previously stopped watching or listening, or the situation where he or she wants to begin playing at that location the very first time he or she requests that content. For the resume playback situation, if the user's prior location does not neatly align with the beginning of chapters or tracks, then service unit 30 can create a new data block "on the fly," with the new data block beginning at the precise location where the user previously left off. This will ensure that only one 15 second buffer delay is incurred, and will maximize the amount of time before the next data block is streamed (i.e., to ensure that the next 15 second buffer delay will occur a full 30 minutes later instead of some amount of time less than 30 minutes).

It would be understood by one of skill in the art that the size of the buffer described above (15 seconds worth of data) is illustrative and not limiting. The embodiments described herein can be applied regardless of the size of the buffer. Similarly, the limit on maximum data block size described above (30 minutes worth of data), the size and number of chapters, the type of underlying digital content, and the number of chapters per block also are illustrative and not limiting. The embodiments described herein can be applied regardless of the maximum size of the data blocks.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A method for resuming playback of streamed digital content at a location where the playing of said content previously was stopped, comprising:
   streaming content in a wireless fashion to a mobile handset;
   initiating a timer on said mobile handset;
   playing said content on said mobile handset;
   receiving a command including a request to stop playing said content;
   stopping the playing of said content on said mobile handset;
   stopping the streaming of said content to said mobile handset;
   based on timer data from said mobile handset, recording a log entry in a log associated with said mobile handset, wherein said log entry identifies a location within said content at the time when said mobile handset stopped playing said content;
   receiving a first request from said mobile handset to resume streaming of said content;
   based on said log entry, informing said mobile handset of said location within said content where the playing of said content previously was stopped; and
   resuming streaming of said content at said location to said mobile handset in response to a second request from said mobile handset to resume streaming of said content at said location.

2. The method of claim 1, further comprising:
   streaming said content and associated metadata to said mobile handset, wherein said associated metadata includes a length of said content; and
   receiving a user command to stop playing said content.

3. The method of claim 1, wherein said content comprises one or more of: audio content and video content.

4. The method of claim 1, wherein said location is the beginning of a chapter of said content.

5. The method of claim 1, wherein said location is a location in a chapter of said content other than the beginning of said chapter.

6. An apparatus for resuming the streaming of digital content at a location where the playing of streaming of said content previously was stopped, comprising:
   a server containing digital content and configured to stream said content to a mobile handset over a wireless network; and
   said server further including a log associated with said mobile handset, wherein said server records a log entry in said log based on timer data received from said mobile handset, and wherein said log entry identifies a location within said content at the time when said content stops playing on said mobile handset in response to a command received at said mobile handset to stop playing said content;
   wherein said server is further configured to:
      receive a first request from said mobile handset to resume streaming of said content;
      based on said log entry, inform said mobile handset of said location within said content where the playing of said content previously was stopped; and
      resume streaming of said content at said location to said mobile handset in response to a second request from said mobile handset to resume streaming of said content at said location.

7. The apparatus of claim 6, wherein said log entry identifies a location within said content at the time when said content stops playing on said mobile handset in response to a user command received at said mobile handset to stop playing said content.

8. The apparatus of claim 6, wherein said content comprises one or more of: audio content and video content.

9. The apparatus of claim 6, wherein said location is the beginning of a chapter of said content.

10. The apparatus of claim 6, wherein said location is a location in a chapter of said content other than the beginning of said chapter.

11. A method for streaming digital content, comprising:
    storing a piece of digital content as a first set of a plurality of blocks, each block beginning and ending at a unique location within said digital content;
    streaming one or more blocks of the first set to a mobile handset over a wireless network;
    in response to a command received at said mobile handset to stop playing said digital content, stopping the streaming of said digital content to said mobile handset;
    recording a log entry in a log associated with said mobile handset, wherein said log entry identifies a location within said digital content at the time when the streaming was stopped;
    receiving a first request from said mobile handset to resume streaming of said digital content;
    based on said log entry, informing said mobile handset of said location within said digital content where the streaming of said digital content previously was stopped;
    and
    resuming streaming of said digital content at said location to said mobile handset over a wireless network in response to a second request from said mobile handset to resume streaming of said digital content at said location.

12. The method of claim 11, further comprising:
    streaming said digital content and associated metadata to said mobile handset, wherein said associated metadata includes a length of said digital content;
    creating and streaming a new block to said mobile handset when said location within said digital content is not aligned with the beginning of any block of the first set, wherein said new block begins at said location within said digital content; and in response to a user command received at said mobile handset to stop playing said digital content, stopping the streaming of said digital content to said mobile handset.

13. The method of claim 11, wherein said digital content comprises one or more of: audio content and video content.

14. The method of claim 11, wherein each block in the first set comprises one or more chapters of said digital content.

15. The method of claim 14, wherein each block in the first set has a duration of approximately thirty minutes.

16. An apparatus for streaming digital content at a location other than the very beginning of said digital content, comprising:
   a server containing digital content and the capability to stream said content to a handset over a wireless network;
   said server comprising a storage device for storing said digital content as a first set of a plurality of blocks, each block beginning at a unique location within said digital content;
   said server configured for receiving a command from a mobile handset requesting the streaming of said digital content to said mobile handset;
   said server configured for stopping the streaming of said digital content to said mobile handset in response to a command received at said mobile handset to stop playing said digital content;
   said server configured for recording a log entry in a log associated with said mobile handset, wherein said log entry identifies a location within said digital content at the time when the streaming was stopped;
   said server configured for receiving a first request from said mobile handset to resume streaming of said digital content;
   said server configured for, based on said log entry, informing said mobile handset of said location within said content where the streaming of said digital content previously was stopped; and
   said server configured for resuming streaming of said digital content at said location to said mobile handset in response to a second request from said mobile handset to resume streaming of said digital content at said location.

17. The apparatus of claim 16, wherein said log entry identifies a location within said digital content at the time when said digital content stops playing on said mobile handset in response to a user command received at said mobile handset to stop playing said digital content.

18. The apparatus of claim 16, wherein said digital content comprises one or more of: audio content and video content.

19. The apparatus of claim 16, wherein each block in said first set comprises one or more chapters of said digital content.

20. The apparatus of claim 16, wherein each block in said first set has a duration of approximately thirty minutes.

* * * * *